(No Model.)

C. D. SMITH.
FURROWER AND MARKER.

No. 308,637. Patented Dec. 2, 1884.

Witnesses
James R. Bowen.
Edward T. Roche.

Inventor
Coe D. Smith,
by his attorneys,
Gifford & Brown

UNITED STATES PATENT OFFICE.

COE D. SMITH, OF SMITHTOWN BRANCH, NEW YORK.

FURROWER AND MARKER.

SPECIFICATION forming part of Letters Patent No. 308,637, dated December 2, 1884.

Application filed May 2, 1884. (No model.)

*To all whom it may concern:*

Be it known that I, COE D. SMITH, of Smithtown Branch, in the county of Suffolk and State of New York, have invented a certain new and useful Improvement in Furrowers and Markers, of which the following is a specification.

I will describe an article embodying my improvement, and then point out its various features in claims.

Figure 1:
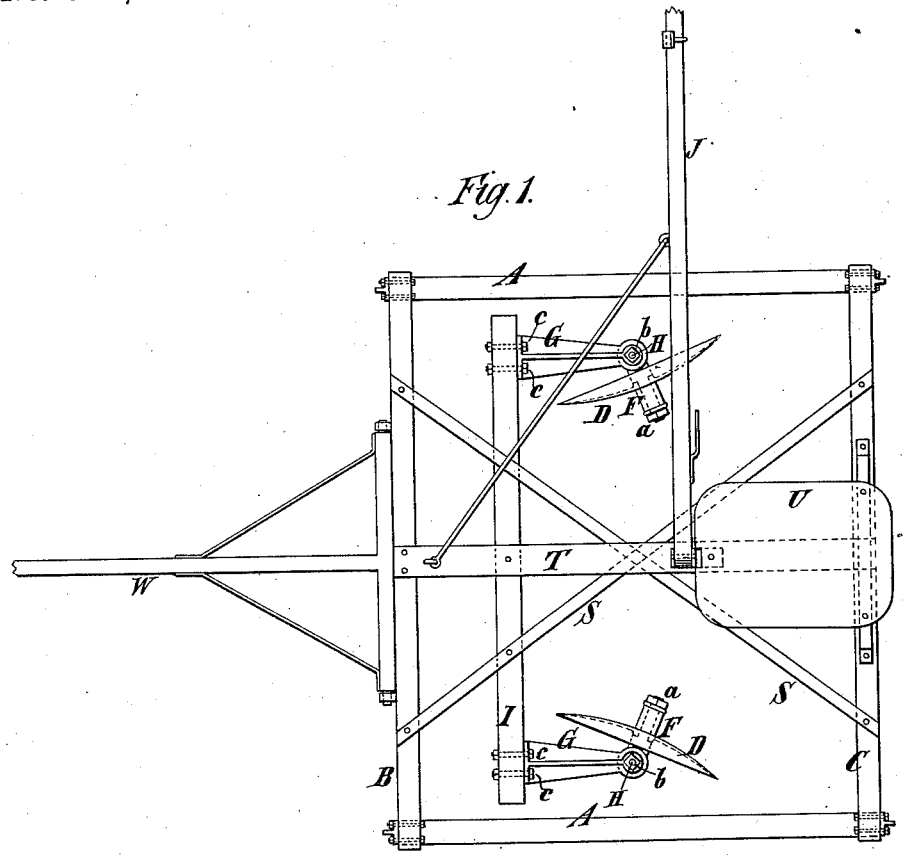
Figure 2:
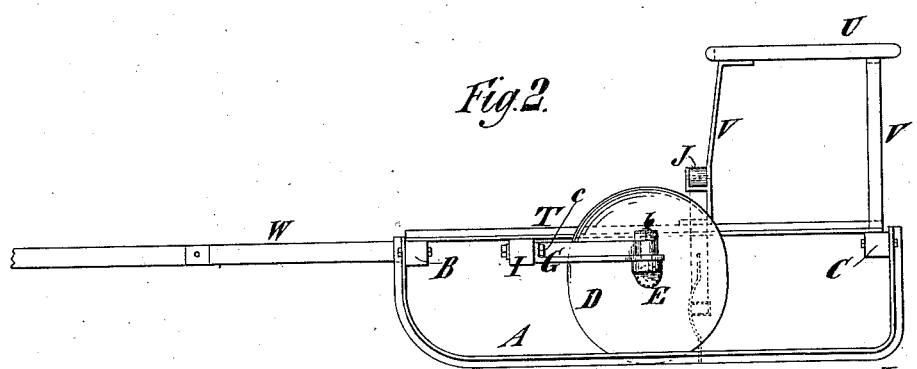

In the accompanying drawings, Figure 1 is a plan or top view of a furrower and marker embodying my improvement, and Fig. 2 is a side view of the same.

Similar letters of reference designate corresponding parts in both figures.

A designates runners, which preferably may be made of iron, and of a width which will enable them to slide over the ground without sinking too deeply. Said runners resemble the runners of a sleigh. As shown, there are two of them. At their front ends they are connected to a bar, B, and at their rear ends they are fastened to a bar, C, which extend between them. They may be secured to these bars so as to be detachable therefrom, and so that they can be adjusted along the bars to different distances apart. The bars may also be capable of adjustment at different elevations relatively to the runners, if desirable. These various adjustments may be provided for by providing the bars and runners with series of holes and employing bolts in the holes. Other means may, however, be employed in lieu of these, if preferable.

The bars B C may be connected by crossed diagonal braces S. A bar, T, extends between the bars B C lengthwise of the furrower or marker, like a reach. A seat, U, is erected on legs V, two of which are shown as fastened by bolts to the bar C, and one of which is secured in a similar manner to the bar T. A tongue, W, is secured to the bar B, so that it can be swung up and down, but not laterally. An ordinary whiffletree can be used.

D designates disks for furrowing or marking out furrows. They will preferably be made of concavo-convex form, and may be made of iron or steel. They are mounted loosely on non-rotary shafts, so that they can turn around as they move over the ground. These shafts may be supported in any suitable manner. For instance, they may be supported in boxes or loops E, and collars F may be made integral with them, so as to extend beyond the disks, to afford the disks a stable support. Heads $a$ are formed on the ends of the shafts beyond the collars, so as to maintain the disks in position. The boxes or loops are then secured to arms G by nuts $b$, applied to bolts H, extending from the boxes or loops. These nuts may serve to afford provision for adjusting the shafts and the boxes or loops in which they are supported at different angles and clamping them in any position to which they may be adjusted.

I designates a bar extending across the furrower or marker in a position parallel or approximately parallel with the bars B C. It is shown as secured by bolts or rivets to the bar T and the braces S. The arms G are secured to the bar I by bolts $c$ passing through holes $d$ in this bar or by other appropriate means. By taking out the bolts and passing them through other holes the arms G may be secured in other positions nearer together or farther apart.

I may employ a gage, J, for marking a line, along which the furrower or marker may be directed in making a subsequent transit across a field. Such guide may be capable of being swung over to either side of the machine and of being detached when not needed.

This machine may be used for covering furrows, as well as for making furrows and marking a field. In the latter case the disks will be adjusted suitably for effecting the desired result.

The advantages resulting from arranging the disks near the center of the length of the machine are numerous. The lateral vibration of the machine derived from the motion of a team will cause less motion to the disks when so arranged than when arranged beyond the rear end of the runners. The pitching or longitudinal rocking motion of the machine caused by its passage over uneven ground will not lift or force down the disks as much as though they were arranged behind the runners. These differences in the action of the disks will cause a greater regularity in the work done by them both in vertical and lateral directions. The tendency of the draft to lift the forward end of the machine will affect the disks less when they are arranged near the center than if they were arranged beyond the rear of the runners, for in the latter case the disks would be forced down whenever that tendency became operative. The machine can operate closer to a fence in making each traverse over a field than when the disks are arranged behind the runners, and the few feet thus utilized at each traverse of the machine over a field will aggregate a considerable area on the whole field. The machine can be more easily turned around, because when the disks are forward of the rear ends of the runners the rear end of the machine, when tilted, will afford a leverage favorable to the operator. The operator, while on his seat, can more conveniently view the disks while they are at work than he could do if the disks were arranged rearward of the runners and the seat.

I do not claim, broadly, the combination of the runners, the bars to which the ends of the runners are connected, and the disks, irrespective of the position of the disks.

What I claim as my invention, and desire to secure by Letters Patent, is—

1. The combination of the runners, the bars to which the ends of the runners are connected, and the disks arranged rearward of the bar connecting the forward ends of the runners, and forward of the bar connecting the rearward ends of the runners, substantially as specified.

2. The combination of the runners A, the bar B, connecting the forward ends of the runners, the bar C, connecting the rearward ends of the runners, and the disks D, arranged rearward of the bar B and forward of the bar C, and connected to the bar I, substantially as and for the purpose specified.

COE D. SMITH.

Witnesses:
T. J. KEANE,
WM. G. LIPSEY.